June 15, 1954  K. W. KNUTSON  2,681,132
RECIPROCATING CONVEYER
Filed May 20, 1953  2 Sheets-Sheet 1
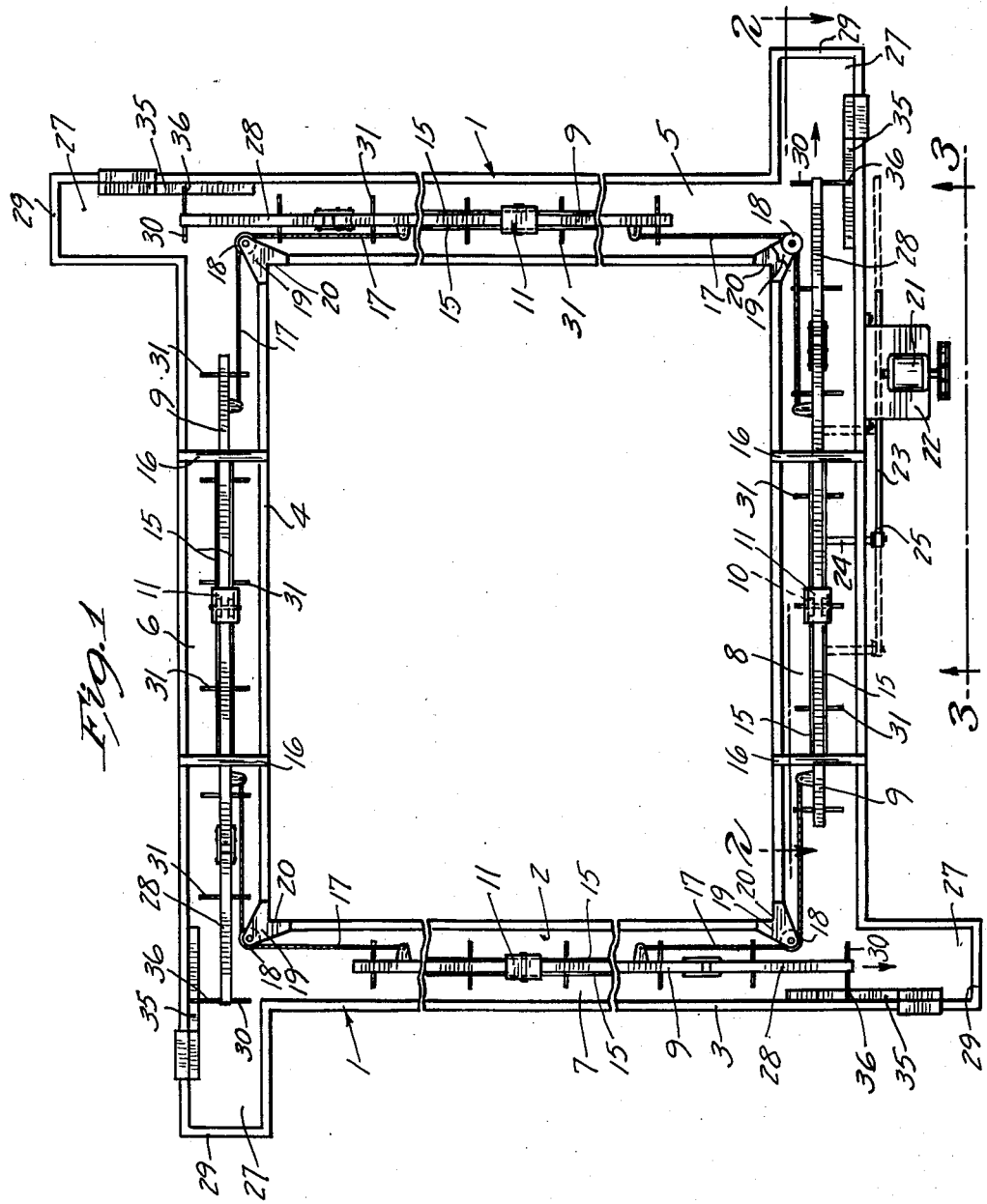
INVENTOR.
Kenneth W. Knutson
BY
Merchant & Merchant
ATTORNEYS June 15, 1954  K. W. KNUTSON  2,681,132
RECIPROCATING CONVEYER
Filed May 20, 1953  2 Sheets-Sheet 2
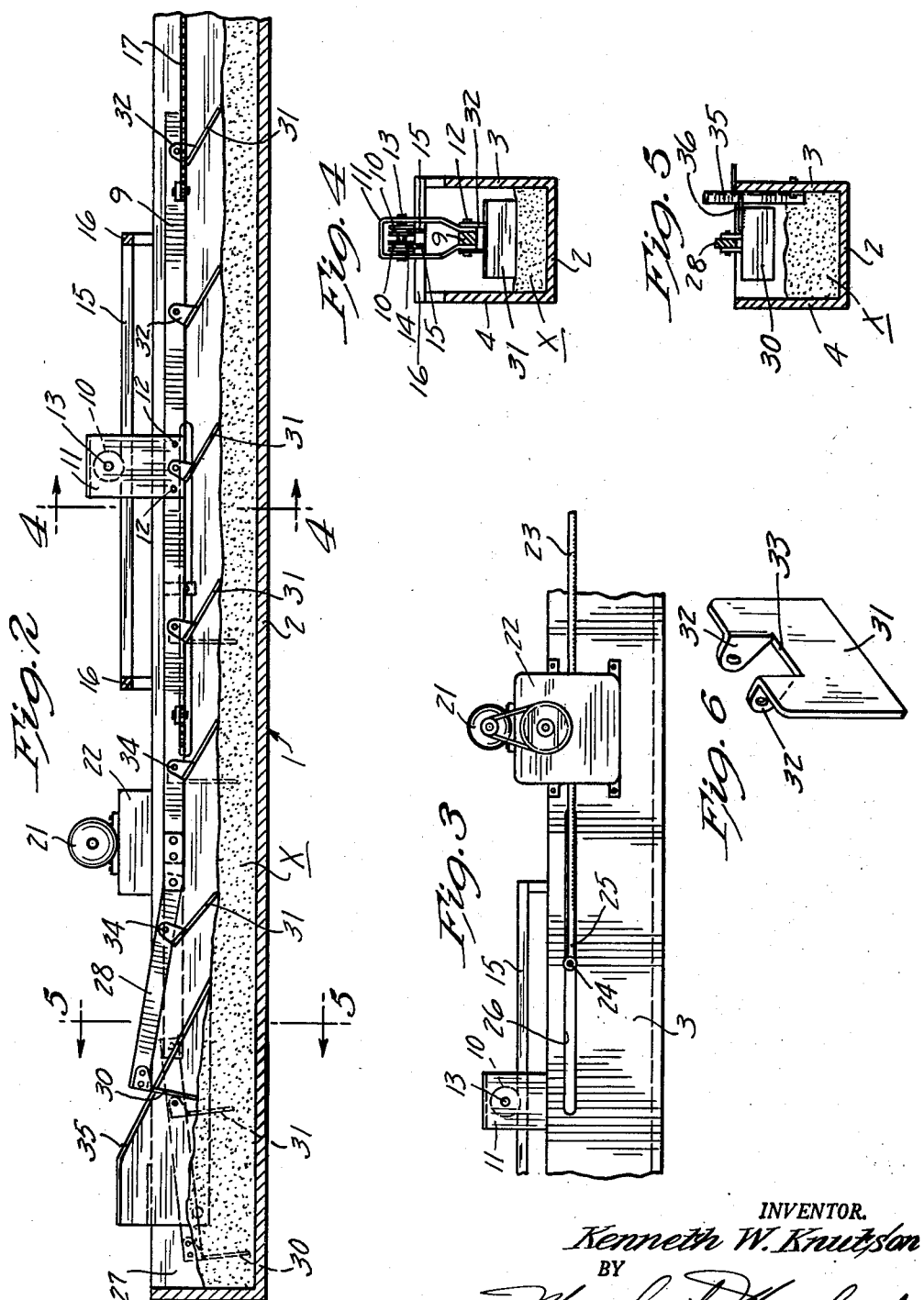
INVENTOR.
Kenneth W. Knutson
BY
Merchant & Merchant
ATTORNEYS

UNITED STATES PATENT OFFICE 2,681,132

RECIPROCATING CONVEYER

Kenneth W. Knutson, New Ulm, Minn.

Application May 20, 1953, Serial No. 356,228

3 Claims. (Cl. 198—85)

My invention relates to chicken feeders and more particularly to mechanical chicken feeders.

The primary object of my invention is the provision of a chicken feeder comprising an endless loop shaped feed trough and coupled with power means for evenly distributing granular feed or the like about the trough from a storage hopper or supply tank which feeds into the trough at any given point in the loop.

A still further object of my invention is the provision of a multi-sided continuous feed trough defining a plurality of straight trough sections, each of said trough sections having a conveyor or push rod mounted for longitudinal reciprocatory movements adjacent thereto, flexible linkage connecting the rods together for common movements, a plurality of longitudinally spaced impeller blades pivotally secured to each of said conveyor rods for upward swinging movements on the return flights of said push or conveyor rods, and stop means limiting movements of the blades rearwardly of their substantially vertical feeding positions, whereby feed impelled or conveyed from the rear to the front portion of each trough section will be picked up by the impeller blades of the adjacent trough section, and the feed will thus be continuously distributed throughout the multi-sided or looped feed trough.

In the structure immediately above described I have found that the pivoted impeller blades of necessity carry some feed back with them on their return flights. This is not important along the intermediate portion of each trough section because the impeller blades on their next delivery movement or flight will pick up such material and pass it along. However, this is important with respect to pivoted impeller blades located on the extreme rear end portions of the push rods because the feed adhering to such impeller blades on their return flights is deposited in the corners of the troughs from whence there is no opportunity to remove it. Consequently, such feed accumulates and eventually jams the end of the trough and wastes feed.

A still further and important object of my invention is the provision of novel means for preventing the accumulation of feed in the corners of devices of the class immediately above described.

More specifically, an important object of my invention is the provision of a device of the class described wherein the trough sections are provided with rearwardly projecting extensions, and said push rods are provided at their rear end portions with horizontally pivoted rearwardly extended links, to the rear ends of which are rigidly secured impeller blades which project downwardly therefrom at substantially right angles, and in further combination with cam tracks associated with each of said extension portions and adapted to operatively engage the free ends of said links whereby to elevate same and the impeller blade carried thereby above the level of the feed on their return flights, said cam tracks terminating in spaced relation to the rear ends of said trough extensions but immediately forwardly of the blades rigidly connected to the free ends of said links when said blades are pushed to the extreme limit of their rearward movement whereby to permit said blades to drop to their normal conveying or impelling positions immediately adjacent the rear walls of said trough sections, and thus prevent accumulation of feed adjacent said rear end walls of said trough sections.

A still further object of my invention is the provision of a device of the class described which is relatively inexpensive to produce, which has a minimum of working parts, is durable in construction, and is easy and efficient in operation.

The above and still further objects of my invention will become apparent from the following detailed specification, appended claims and attached drawings.

Referring to the drawings, wherein like characters indicate like parts throughout the several views:

Fig. 1 is a view in top plan of my novel structure, some parts being broken away;

Fig. 2 is a fragmentary vertical section on an enlarged scale taken substantially on the line 2—2 of Fig. 1;

Fig. 3 is a fragmentary view in side elevation on an enlarged scale taken substantially on the line 3—3 of Fig. 2;

Fig. 4 is a view partly in section and partly in end elevation as seen from the line 4—4 of Fig. 2;

Fig. 5 is a view partly in section and partly in end elevation as seen from the line 5—5 of Fig. 2; and Fig. 6 is a perspective view on one of the pivoted impeller blades of my invention.

Referring with greater particularity to the drawings, the numeral 1 indicates in its entirety a multi-sided feed trough, preferably and as shown being generally rectangular in form. Feed trough 1 is generally U-shaped in cross section, the bottom thereof being identified by the numeral 2, the outer side wall by the numeral 3, and the inner side wall by the numeral 4. Each of the sides of the rectangular feed trough 1 are independent trough sections and are identified respectively by the numerals 5, 6, 7, and 8. Pusher or conveyor rods 9 are mounted for reciprocatory movements longitudinally of each of the trough sections 5, 6, 7, and 8, and overlying same, by means of one or more pulleys 10 mounted in inverted U-shaped brackets 11 secured to said push rods 9 by means of rivets or the like 12. The pulleys 10 are rotatably mounted on pins 13 extending transversely through opposite sides of the brackets 11 and are grooved, as at 14, to receive longitudinally extended bars 15 overlying the trough sections 5, 6, 7, and 8 and having their opposite ends rigidly secured to transverse longitudinally spaced spanner bars 16. Push rods 9 are tightly secured together by means of flexible links 17 in the nature of chains or cables which ride upon pulleys 18 mounted in brackets 19 secured to the inside corner portions 20 effected by the intersection of each of the trough sections 5, 6, 7, and 8. Reciprocal movements are imparted to the connected push rods 9 by means of an electric motor or the like 21 associated with a conventional pump jack 22, not shown in detail but including a rack 23 mounted for reciprocatory movements and having an arm 24 projecting at right angles from the end portion 25 through a slot 26 in one of the outer side walls 3. At its inwardly projected end the arm 24 is connected to one of the push rods 9.

For a purpose which will hereinafter become important, each of the trough sections 5, 6, 7, and 8 is provided with a rearwardly extended portion 27. Also each of the push rods 9 has a rigid link 28 pivotally secured on a horizontal axis to its rear end portion, said links forming a rearward extension of said rods 9 which are adapted to move almost to the end walls 29 of each of their cooperating trough sections 5, 6, 7, and 8 upon the return flights or movements of the push rods 9. Rigidly secured to the rearwardly projected end portions of the links 28 are impeller blades 30 which project generally downwardly therefrom at right angles thereto. The remaining impeller blades 31, associated with each of said push rods 9 and links 28, are pivotally secured respectively thereto for upwardly swinging movements upon their return flights or movements whereby to render the same inoperative. This pivotal connection, as shown particularly in Figs. 2, 4 and 6, is effected by means of forwardly projecting ears 32, preferably and as shown integrally formed with and pressed from the intermediate upper portion of the impeller blades 31, whereby to form an upwardly opening notch 33 therein for the reception of push rods 9 and links 28, as the case may be. Pivot pins 34 project through said ears 32 and said push rods 9 and links 28. By this arrangement it will be noted that all of the pivoted impeller blades 31 will be caused to assume their full line position of Fig. 2 on their return flight but will assume and be retained in the dotted line position of Fig. 2 upon the delivery flight of said push rods 9 by contact of the lower edge of the notch 33 with the bottom surface of the push rods 9 and links 28.

In order to prevent accumulation of granular feed material X in the trough sections 5, 6, 7, and 8, and particularly adjacent the end walls 29 of the extension portions 27, I provide upwardly and rearwardly extended cam tracks 35 which extend into said extension portions 27 but terminate in spaced relation to said end walls 29. Laterally projecting fingers 36, carried by the rigid impeller blades 30, are caused to engage and ride upon the cam tracks 35 during the rearward movements or flights of said push rods 9 and links 28, thus causing the free ends of said links 28 and the impeller blades 30 carried thereby to be elevated above the level of the feed X. It will be noted that the limit of return movements of the push rods 9 and links 28 is rearwardly of the cam tracks 35 whereby to cause disengagement of the fingers 36 therewith with the consequent dropping of the links 28 and impeller blades 30 carried thereby to the dotted line position of Fig. 2. The feed X is fed into the trough 1 at any given point thereabout by means of a storage bin or hopper overlying the tracks 35 and preferably having outlet means therein which feeds equally on each side of one of the push rods 9.

My invention has been thoroughly tested and found to be completely satisfactory for the accomplishment of the above objects, and while I have disclosed a preferred embodiment thereof, I wish it to be specifically understood that same is capable of modification without departure from the scope and spirit of the appended claims.

What I claim is:

1. In a device of the class described a multi-sided continuous feed trough defining a plurality of straight sections, a conveyor rod mounted for longitudinal reciprocatory movements adjacent to and generally parallel with each section of said trough, linkage connecting said rods together for common movements, a plurality of longitudinally spaced feed impelling blades pivotally connected to each of said conveyor rods for upwardly swinging movements in a direction forwardly with respect to the direction of feeding movement, stop means limiting movements of said blades rearwardly of their substantially vertical feeding positions each of said trough sections having a portion extending rearwardly of the point of intersection thereof with the forward end of the connecting trough section, a rigid link pivotally secured to the rear end portion of each of said conveyor rods for swinging movements about a horizontal axis and forming a rearward extension thereof, a feed impelling blade adjacent the free end of said link, and means associated with said extension portion of each of said trough sections elevating the free end of said link and blade associated therewith above the normal level of feed within said trough on its rearward return flight, said means permitting said link to drop to its normal feed engaging position at the extreme limit of its rearward movement.

2. The structure defined in claim 1 in which said means includes a rearwardly and upwardly extending cam track operatively engageable with the free end of said rigid link.

3. In a device of the class described, a generally rectangular continuous feed trough defining a plurality of connected trough sections, a conveyor rod overlying each of said trough sections and mounted for longitudinal reciprocatory movements with respect thereto, flexible linkage connecting adjacent ends of said conveyor rods for common movements, each of said flexible links engaging friction reducing pulleys adjacent the connecting inside walls of said trough sections, a plurality of longitudinally spaced feed impelling blades pivotally connected to each of said conveyor rods for upwardly swinging movements in a direction forwardly with respect to the direction of feeding movement whereby to render said blades inoperative on the return movements of said conveyor rods, stop means limiting movements of said blades rearwardly of their substantially vertical feeding positions, each of said trough sections having a portion extending rearwardly of the point of intersection thereof with the forward end of the connecting trough section, a rigid link pivotally secured to the rear end portion of each of said conveyor rods for swinging movements about a horizontal axis and forming a rearward extension thereof, a feed impelling blade rigidly secured to the free end of said link and projecting downwardly therefrom at substantially right angles thereto, an upwardly and rearwardly extending cam track associated with the extension portion of each of said trough sections and disposed laterally with respect to the free ends of said rigid links, means on the free end of said links engageable with its adjacent cam track whereby to elevate the free end of said link and blade carried thereby above the normal level of feed within said trough on return movements of said conveyor rod and link, each of said cam tracks terminating in spaced relation to the rear end portions of each of said trough sections but forwardly of the blade rigidly connected to the free end of said link when said blade is moved to the limit of its rearward movement whereby to permit said blade to drop to its normal feed conveying position at the extreme limit of its rearward movement, and means for imparting reciprocatory movements to said conveyor rods.

No references cited.